US008402420B2

(12) United States Patent
Jiang et al.

(10) Patent No.: US 8,402,420 B2
(45) Date of Patent: Mar. 19, 2013

(54) DESIGNING AN OPTIMAL WIRING TOPOLOGY FOR ELECTROMIGRATION AVOIDANCE

(75) Inventors: Hui-Ru Jiang, Hsinchu (TW); Hua-Yu Chang, Hsinchu (TW); Chih-Long Chang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 38 days.

(21) Appl. No.: 12/926,505

(22) Filed: Nov. 23, 2010

(65) Prior Publication Data

US 2012/0060137 A1 Mar. 8, 2012

(30) Foreign Application Priority Data

Sep. 6, 2010 (TW) ................................. 99130091 A (51) Int. Cl.
*G06F 17/50* (2006.01)
*G06F 9/455* (2006.01)
*G06F 11/22* (2006.01)

(52) U.S. Cl. ........ 716/135; 716/136; 716/132; 716/118; 716/122; 716/126; 716/129

(58) Field of Classification Search .................. None
See application file for complete search history.

(56) References Cited

U.S. PATENT DOCUMENTS

| 6,877,148 | B1 * | 4/2005 | Hassibi et al. ................. 716/129 |
| 7,131,096 | B1 * | 10/2006 | Balsdon et al. ................ 716/129 |
| 7,305,641 | B2 * | 12/2007 | Tang .............................. 716/122 |
| 7,784,010 | B1 * | 8/2010 | Balsdon et al. ................ 716/118 |
| 7,904,840 | B2 * | 3/2011 | Tang .............................. 716/132 |
| 8,095,903 | B2 * | 1/2012 | Birch et al. .................... 716/126 |
| 2009/0013290 | A1 * | 1/2009 | Keinert et al. .................... 716/4 |

OTHER PUBLICATIONS

Jiang et al., WiT: Optimal Wiring Topology for Electromigration Avoidance, IEEE Transaction on Very Large Scale Integration (VLSI) Systems, pp. 1-12, Mar. 2011.*
Lienig et al., Current-driven Wire Planning for Electromigration Avoidance in Analog Circuits, Proceedings of the Asia and South Pacific Design Automation Conference, pp. 783-788, Jan. 2003.*
Lienig et al., Electromigration Avoidance in Analog Circuits: Two Methodologies for Current-driven Routing, Proceedings of the 7th Asia and South Pacific Design Automation Conference on VLSI Design, pp. 372-378, Jan. 2002.*
Jiang et al., Iris H.-R.; Optimal Wiring Topology for Electromigration Avoidance Considering Multiple Layers and Obstacles, 19th ACM International Symposium on Physical Design, Mar. 14-17, 2010, San Francisco, CA, USA.

* cited by examiner

*Primary Examiner* — A. M. Thompson
(74) *Attorney, Agent, or Firm* — Bacon & Thomas, PLLC (57) ABSTRACT

A method for designing an optimal wiring topology for electromigration avoidance is disclosed. The wiring topology includes multiple sources, multiple sinks and multiple wires. The method includes the following steps: A feasible wire, a wire of the shortest length connecting each pair of source and sink, is calculated, and the capacity of each feasible wire is decided. An initial feasible topology is found. A flow network is created based on the initial topology. Negative cycles are iteratively checked and removed until no more negative cycles.

10 Claims, 13 Drawing Sheets

DESIGNING AN OPTIMAL WIRING TOPOLOGY FOR ELECTROMIGRATION AVOIDANCE

BACKGROUND OF THE INVENTION (1) Field of the Invention

The invention relates to a method for designing wiring topology and a fabrication method of integrated circuits including said method, and especially relates to a method for designing optimal wiring topology applied for electromigration avoidance in an integrated circuit.

(2) Description of the Prior Art

For the shrinking feature size and multiple functions of the chip, the components and the designed wires thereof disposed on the chip are more complex, so the size of the wires should be shrunk. Therefore, as the long term usage of the chip or the current density of the wire exceeding the process limitation, a mass of atoms inside of the metal wire are forced to migrate along the direction of the current, and the gradual transport eventually causes the void and the hillock formed on the wire. Said phenomenon is referred to as electromigration (EM), and the electromigration causes a permanent failure, such as open circuit or short circuit. For example, the failure of the chip is triggered when the hillock of the wire contacting with the neighbor.

The conventional method for EM avoidance essentially relies on the following two techniques: one is an accurate EM simulator for increasing the reliability; the other is a good wiring topology for EM avoidance.

The first technique is that the chip is analyzed by an accurate EM simulator at post routing for diminishing the EM risk. The narrow wire routed on the chip is widened according to the current density of the wire. However, the conventional EM fixing is applied at post-layout, which may consume tremendous routing resources and induce a large amount of layout change.

The second technique is that the good wiring topology considering EM is applied to a router, which may immune EM with much fewer routing resources. One of the conventional method for designing wiring topology is based on the Delaunay triangulation (DT) algorithm to calculate the feasible solution of the wire in advance of EM avoidance.

The DT-based method is described as below. First of all, the connected graph is constructed by the Delaunay triangulation algorithm so that each of all the source currents is connected with each of all the sink currents. Secondly, a source or a sink at the DT boundary is selected as the starting point, and the starting point is connected to the nearest neighbor in DT. Considering the two possible current directions of the connection wire, the starting point is then greedily connected to the nearest neighbor with the feasible solution and the width of the wire is determined accordingly. Another point at the DT boundary is selected to obtain the better result. Said process is repeated and, finally, the resulting tree is formed by the method for designing wiring topology with the DT-based method.

However, the tree edge is able be provided only from DT edges; thus, if the solution must include a non-DT edge, the wiring topology fails.

Consequently, how to find the optimal wiring topology to avoid electromigration and to save the routing resource is an important issue.

SUMMARY OF THE INVENTION

Accordingly, the objective of the invention is to provide a method for designing wiring topology applied for electromigration avoidance.

In one aspect, the invention provides a method for designing wiring topology, applied for selecting an optimal wiring topology for electromigration avoidance among a plurality of wiring topologies on a chip set. Wherein each of the wiring topologies has a plurality of sources, a plurality of sinks and a plurality of wires, each of the wires is directly connected between one of the sources and one of the sinks, each of the sources provides a source current, each of the sinks receives a sink current, and an effective current flows from one of the sources into one of the sinks through each of the wires.

The steps of the method includes: calculating the lengths of all the wires to choose the minimum among the wires as a feasible wire; deciding a capacity of the feasible wire, wherein the capacity is the maximum of the effective current through the feasible wire; deciding the capacity of each of the other wires according to the capacity, the source current and the sink current of the feasible wire; comparing the length of the other wires to choose another feasible wire; repeating said steps until finding all feasible wires to construct a feasible wiring topology; creating a flow network according to the feasible wiring topology; executing an algorithm to iteratively check if a negative cycle existing in the flow network; and removing the negative cycle if existing in the flow network to obtain the optimal wiring topology. Wherein the feasible wiring topology is defined as the optimal wiring topology if no more the negative cycle existing in the flow network.

In an embodiment, further including: replacing the feasible wire with a ladder-type wire by one end of the feasible wire connected by a horizontal wire and another end of feasible wire connected by a vertical wire, wherein the horizontal wire is perpendicular to the vertical wire.

In an embodiment, an obstacle is disposed on the chip set, and the obstacle is bypassed by one of the wires, so the steps of the method comprises: adding a routing length to the length of the wire bypassing the obstacle.

In an embodiment, the chip set has at least two routing layers stacked, and the length of the wire passing the two routing layers has a minimal distance between the two routing layers.

In another aspect, the invention provides a fabrication method of integrated circuits integrate circuit including the method for designing wiring topology, wherein the method for designing wiring topology is utilized before the routing stage.

In the other aspect, the invention provides a fabrication method of integrated circuits including the method for designing wiring topology, wherein the method for designing wiring topology is utilized after the routing stage to apply for local modification.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "a" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

The present invention provides a method for designing wiring topology for electromigration avoidance and a fabrication method of integrated circuits including said method, applied on a chip set. The method for designing wiring topology is utilized before the routing stage, where the routing stage in the fabrication method of integrated circuits is applied for the components electrically connected with each other on the chip set. In other words, the method for designing wiring topology with considering the electromigration avoidance is able to find an optimal wiring topology for decreasing the routing resources when the designed wiring stage of the chip set without routing. Therefore, the method for designing wiring topology is able to be utilized after the routing stage to apply for local modification for keeping electromigration off in an integrated circuit.

For executing the method for designing wiring topology to avoid electromigration, a computer is utilized in the present invention to run a wiring topology designed software. The wiring topology designed software provides a flow network to simulate the wiring topology. The hardware in the method for designing wiring topology is described as below. The computer has an input unit, an operating unit, a storage unit and an output unit. The input unit is a keyboard or a handwriting input device. The operation unit is a central processing unit (CPU). The storage unit is a hardware electrically connected to the input unit, the operating unit and the output unit. The wiring topology designed software is installed in the hardware. The output unit is a display or a printer.

Figure 1:
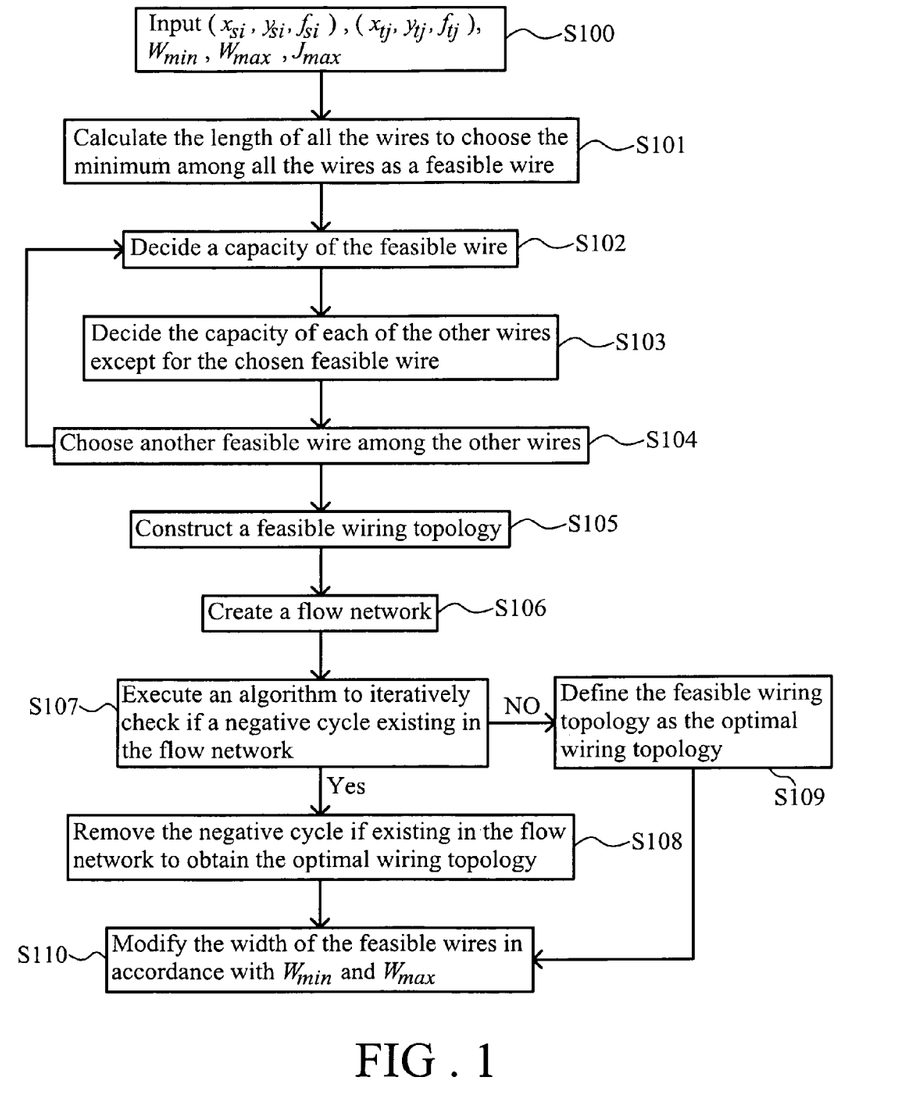
FIG. 1 is a chart showing the method for designing wiring topology.

Refer to FIG. 1 for a chart showing the method for designing wiring topology. The steps of the method are described as below.

Step(100): input the positions and the source currents of the sources $(x_{si}, y_{si}, f_{si})$, the positions and the sink currents of the sinks $(x_{tj}, y_{tj}, f_{tj})$, a minimal wiring length $w_{min}$, a maximal wiring length $w_{max}$ and a maximum tolerable current density $J_{max}$ by an user of the wiring topology designed software via the input unit. Wherein the wiring topology has a plurality of sources, a plurality of sinks and a plurality of wires, each of the wires is straightly connected between one of the sources and one of the sinks, and an effective current flows from one of the sources into one of the sinks through each of the wires.

Step(101): calculate the length of all the wires to choose the minimum among all the wires as a feasible wire, which has a minimal length of all the wires, via the operating unit.

Step(102): decide a capacity of the feasible wire, and an effective current of each feasible wire smaller than or equal to the corresponding capacity. In other words, the capacity is the maximum of the effective current through the feasible wire. Wherein the minimum $\min(f_{si}, f_{tj})$ of the source current $f_{si}$ and the sink current $f_{tj}$ is selected as the capacity of the feasible wire.

Step(103): decide the capacity of each of the other wires except for the chosen feasible wire according to the capacity, the source current and the sink current of the feasible wire.

Step(104): compare the length of the other wires to choose the minimum among the other wires as another feasible wire, which has a secondary minimal length of all the wires, and back to step(S102). Therefore, judge if the capacity of each of the other wires is zero. When the capacity of one of the other wires is zero, said wire should not be added more capacity up, so said wire is unable to be as the feasible wire.

Step(105): repeat said step(S102) to step(S104) until find all feasible wires to construct a feasible wiring topology. Wherein a current density of each of the feasible wires is smaller than or equal to the maximum tolerable current density $J_{max}$.

Step(106): create a flow network according to the feasible wiring topology.

Step(107): execute an algorithm to iteratively check if a negative cycle existing in the flow network. Yes for going to the step(S108); no for going to the step(S109). Wherein said algorithm is a negative cycle detection algorithm.

Step(108): remove the negative cycle if existing in the flow network to obtain the optimal wiring topology and go to the step(S110).

Step(109): define the feasible wiring topology as the optimal wiring topology.

Step(110): modify the over extension or the under extension for the width of the feasible wires in the optimal wiring topology in accordance with the minimal wiring length $w_{min}$ and the maximal wiring length $w_{max}$.

Finally, replace the feasible wire with a ladder-type wire by one end of the feasible wire connected by a horizontal wire and another end of the feasible wire connected by a vertical wire. Wherein the horizontal wire is perpendicular to the vertical wire. The below steps is illustrated that the method for designing wiring topology is applied for finding an optimal wiring topology on the chip set in advance of the designed wiring stage. The optimal wiring topology connected all the sources and the sinks is formed as an optimal rectilinear routing S+T, so that the current is able to flow through each wire and to satisfy the Kirchhoff's current conservation law.

Step 1: given a set $S=\{s_1, s_2, \ldots, s_m\}$ of m sources, a set $T=\{t_1, t_2, \ldots, t_n\}$ of n sinks, each source i is associated with its flow characterized source current $f_{si}$ and each sink j is associated with its flow characterized sink current $f_{sj}$.

Figure 2:
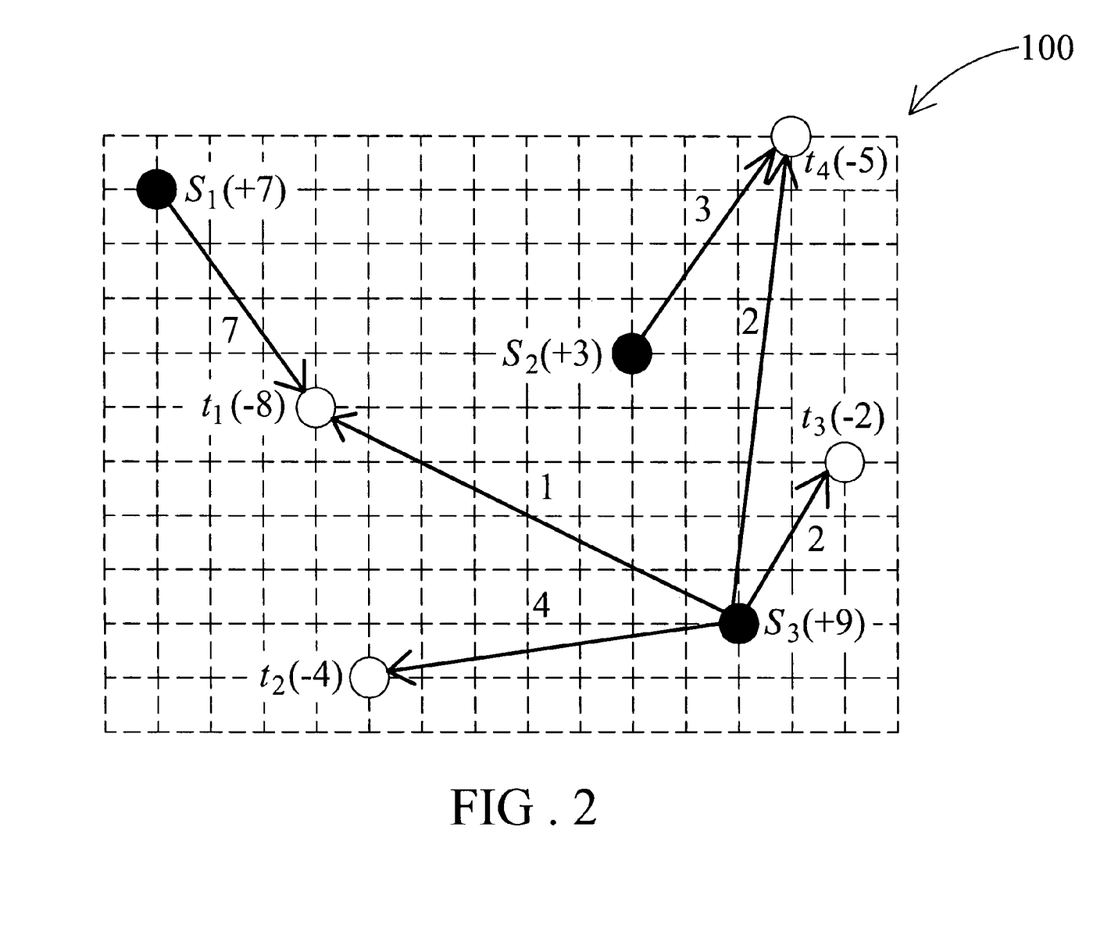
FIG. 2 is a schematic view of the feasible wiring topology on the chip set with single routing layer.

In an embodiment, a single routing layer of the chip set 100 having three sources and four sinks is illustrated with FIG. 2. The data of the sources $S=\{s_1, s_2, s_3\}$ and the data of the sinks $T=\{t_1, t_2, t_3, t_4\}$ are tabulated. The wire and its capacity between the sources $S=\{s_1, s_2, s_3\}$ and the sinks $T=\{t_1, t_2, t_3, t_4\}$ are shown as Table 1 to Table 7. Wherein each lattice (L, C) represents each connection having the length L of the wire and the capacity C.

1. Calculate the length of all the wires to choose the minimum among all the wires as a feasible wire and decide a capacity of the feasible wire. Wherein the minimum min($f_{si}$, $f_{tj}$) among the source current $f_{si}$ and the sink current $f_{tj}$ is selected as the capacity of the feasible wire.

As Table 1 showing, the connection (5,2) is selected as the feasible wire, and the former represents the length of the feasible wire and the latter represents the capacity of the feasible wire. Because the sources $s_3$ of the feasible wire has the source current $f_{si}$=+9 and the sink $t_3$ of the feasible wire has the sink current $f_{tj}$=-2, the capacity of the feasible wire is min($|f_{si}|$, $|f_{tj}|$)=2. Said feasible wire is the wire between the source $s_3$ and the sink $t_3$ as shown in FIG. 2. Wherein the source current, provided by the source, is represented by the positive signs "+", and the source current, received by the sink, is represented by the negative signs "−".

TABLE 1

The length and the capacity of the wire in the step 1 . . .

| S/T | $t_1$(−8) | $t_2$(−4) | $t_3$(−2) | $t_4$(−5) |
|---|---|---|---|---|
| $s_1$(+7) | (7, 7) | (13, 4) | (18, 2) | (13, 5) |
| $s_2$(+3) | (7, 3) | (11, 3) | (6, 2) | (7, 3) |
| $s_3$(+9) | (12, 8) | (8, 4) | (5, 2) * | (10, 5) |

* (the length of the feasible wire, the capacity of the feasibke wire)

2. Decide the capacity of each of the other wires except for the chosen feasible wire according to the capacity, min($|f_{si}|$, $|f_{tj}|$)=2, of the connection (5,2), the source current $f_{si}$=+9 of the source $s_3$ and the sink current $f_{tj}$=−2 of the sink $t_3$. As shown in Table 2, the capacity of the connection between the source $s_1$ and the sink $t_3$ is zero, the capacity of the connection between the source $s_2$ and the sink $t_3$ is zero, the capacity of the connection between the source $s_3$ and the sink $t_1$ is 7 unit, and the capacity of the connection between the source $s_3$ and the sink $t_2$ is 4 unit. Therefore, the source $s_3$ provides the current of 2 unit to the sink $t_3$, so the source current $f_{si}$ of the source $s_3$ is varied from 9 unit to 2 unit. The sink $t_3$ receives the current of 2 unit from the source $s_3$, so the sink current $f_{tj}$ is varied from 2 unit to zero.

Compare the length of the other wires to choose the minimum among the other wires as another feasible wire, which has a secondary minimal length of all the wires, so the connection (7,3) is selected, which represents the wire between the source $s_2$ and the sink $t_4$ in FIG. 2. When the capacity of one of the other wires is zero, said wire is unfeasible, so said wire is unable to be as the feasible wire.

TABLE 2

The length and the capacity of the wire in the step 2 . . .

| S/T | $t_1$(−8) | $t_2$(−4) | $t_3$(0) | $t_4$(−5) |
|---|---|---|---|---|
| $s_1$(+7) | (7, 7) | (13, 4) | (18, 0) | (13, 5) |
| $s_2$(+3) | (7, 3) | (11, 3) | (6, 0) | (7, 3) * |
| $s_3$(+7) | (12, 7) | (8, 4) | (5, 2) * | (10, 5) |

* (the length of the feasible wire, the capacity of the feasibke wire)

3. Decide the capacity of each of the other wires except for the chosen feasible wires according to the capacity, min($|f_{si}|$, $|f_{tj}|$)=3, of the connection (7,3), the source current $f_{si}$=+3 of the source $s_2$ and the sink current $f_{tj}$=−5 of the sink $t_4$. As shown in Table 3, the capacity of the connection between the source $s_1$ and the sink $t_4$ is 2 unit, the capacity of the connection between the source $s_2$ and the sink $t_1$ is zero, the capacity of the connection between the source $s_2$ and the sink $t_2$ is zero, and the capacity of the connection between the source $s_3$ and the sink $t_4$ is 2 unit. Therefore, the source $s_2$ provides the current of 3 unit to the sink $t_4$, so the source current $f_{si}$ of the source $s_2$ is varied from 3 unit to zero. The sink $t_4$ receives the current of 3 unit from the source $s_2$, so the sink current is varied from 5 unit to 2 unit.

Compare the length of the other wires, and the connection (7,7) is selected as another feasible wire, which represents the wire between the source $s_1$ and the sink $t_1$ in FIG. 2.

TABLE 3

The length and the capacity of the wire in the step 3 . . .

| S/T | $t_1$(−8) | $t_2$(−4) | $t_3$(0) | $t_4$(−2) |
|---|---|---|---|---|
| $s_1$(+7) | (7, 7) * | (13, 4) | (18, 0) | (13, 2) |
| $s_2$(0) | (7, 0) | (11, 0) | (6, 0) | (7, 3) * |
| $s_3$(+7) | (12, 7) | (8, 4) | (5, 2) * | (10, 2) |

* (the length of the feasible wire, the capacity of the feasibke wire)

4. Decide the capacity of each of the other wires except for the chosen feasible wires according to the capacity, min($|f_{si}|$, $|f_{tj}|$)=7, of the connection (7,7), the source current $f_{si}$=+7 of the source $s_1$ and the sink current $f_{tj}$=−8 of the sink $t_1$. As shown in Table 4, the capacity of the connection between the source $s_1$ and the sink $t_2$ is zero, the capacity of the connection between the source $s_1$ and the sink $t_3$ is zero, the capacity of the connection between the source $s_1$ and the sink $t_4$ is zero, the capacity of the connection between the source $s_2$ and the sink $t_1$ is zero, and the capacity of the connection between the source $s_3$ and the sink $t_1$ is 1 unit. Therefore, the source $s_1$ provides the current of 7 unit to the sink $t_1$, so the source current $f_{si}$ of the source $s_1$ is varied from 7 unit to zero. The sink $t_1$ receives the current of 7 unit from the source $s_1$, so the sink current $f_{tj}$ is varied from 8 unit to 1 unit.

Compare the length of the other wires, and the connection (8,4) is selected as another feasible wire, which represents the wire between the source $s_3$ and the sink $t_2$ in FIG. 2.

TABLE 4

The length and the capacity of the wire in the step 4 . . .

| S/T | $t_1(-1)$ | $t_2(-4)$ | $t_3(0)$ | $t_4(-2)$ |
|---|---|---|---|---|
| $s_1(0)$ | (7, 7) * | (13, 0) | (18, 0) | (13, 0) |
| $s_2(0)$ | (7, 0) | (11, 0) | (6, 0) | (7, 3) * |
| $s_3(+7)$ | (12, 1) | (8, 4) * | (5, 2) * | (10, 2) |

* (the length of the feasible wire, the capacity of the feasibke wire)

5. Decide the capacity of each of the other wires except for the chosen feasible wires according to the capacity, $\min(|f_{si}|, |f_{tj}|)=4$, of the connection (8,4), the source current $f_{si}=+7$ of the source $s_3$ and the sink current $f_{tj}=-4$ of the sink $t_2$. As shown in Table 5, the capacity of the connection between the source $s_3$ and the sink $t_1$ is 1 unit, and the capacity of the connection between the source $s_3$ and the sink $t_4$ is 2 unit. Therefore, the source $s_3$ provides the current of 4 unit to the sink $t_2$, so the source current $f_{si}$ of the source $s_3$ is varied from 7 unit to 3 unit. The sink $t_2$ receives the current of 7 unit from the source $s_1$, so the sink current $f_{tj}$ is varied from 4 unit to zero.

Compare the length of the other wires, and the connection (10,2) is selected as another feasible wire, which represents the wire between the source $s_3$ and the sink $t_4$ in FIG. 2.

TABLE 5

The length and the capacity of the wire in the step 5 . . .

| S/T | $t_1(-1)$ | $t_2(0)$ | $t_3(0)$ | $t_4(-2)$ |
|---|---|---|---|---|
| $s_1(0)$ | (7, 7) * | (13, 0) | (18, 0) | (13, 0) |
| $s_2(0)$ | (7, 0) | (11, 0) | (6, 0) | (7, 3) * |
| $s_3(+3)$ | (12, 1) | (8, 4) * | (5, 2) * | (10, 2) * |

* (the length of the feasible wire, the capacity of the feasibke wire)

6. Decide the capacity of each of the other wires except for the chosen feasible wires according to the capacity, $\min(|f_{si}|, |f_{tj}|)=2$, of the connection (10,2), the source current $f_{si}=+3$ of the source $s_3$ and the sink current $f_{tj}=-2$ of the sink $t_4$. As shown in Table 6, the capacity of the connection between the source $s_3$ and the sink $t_1$ is 1 unit. Therefore, the source $s_3$ provides the current of 2 unit to the sink $t_4$, so the source current $f_{si}$ of the source $s_3$ is varied from 3 unit to 1 unit. The sink $t_2$ receives the current of 2 unit from the source $s_1$, so the sink current $f_{tj}$ is varied from 2 unit to zero.

Compare the length of the other wires, and the connection (12,1) is selected as another feasible wire, which represents the wire between the source $s_3$ and the sink $t_1$ in FIG. 2.

TABLE 6

The length and the capacity of the wire in the step 6 . . .

| S/T | $t_1(-1)$ | $t_2(0)$ | $t_3(0)$ | $t_4(0)$ |
|---|---|---|---|---|
| $s_1(0)$ | (7, 7) * | (13, 0) | (18, 0) | (13, 0) |
| $s_2(0)$ | (7, 0) | (11, 0) | (6, 0) | (7, 3) * |
| $s_3(+1)$ | (12, 1) * | (8, 4) * | (5, 2) * | (10, 2) * |

* (the length of the feasible wire, the capacity of the feasibke wire)

7. For the capacity of each of the other wires except for the chosen feasible wires being zero, end the steps of finding the feasible wire. All the feasible wires are selected as shown in Table 7 and FIG. 2, where the connection (7,7) represents the wire between the source $s_1$ and the sink $t_1$, the connection (7,3) represents the wire between the source $s_2$ and the sink $t_4$, the connection (12,1) represents the wire between the source $s_3$ and the sink $t_1$, the connection (8,4) represents the wire between the source $s_3$ and the sink $t_2$, the connection (5,2) represents the wire between the source $s_3$ and the sink $t_3$, and the connection (10,2) represents the wire between the source $s_3$ and the sink $t_4$.

Link all the feasible wires with each other to construct a feasible wiring topology. Wherein a current density of each feasible wire is smaller than or equal to the maximum tolerable current density $J_{max}$, so the current flows through each feasible wire for assuredly avoiding electromigration.

TABLE 7

The length and the capacity of the wire in the step 7 . . .

| S/T | $t_1(0)$ | $t_2(0)$ | $t_3(0)$ | $t_4(0)$ |
|---|---|---|---|---|
| $s_1(0)$ | (7, 7)* | (13, 0) | (18, 0) | (13, 0) |
| $s_2(0)$ | (7, 0) | (11, 0) | (6, 0) | (7, 3) * |
| $s_3(0)$ | (12, 1) * | (8, 4) * | (5, 2) * | (10, 2) * |

* (the length of the feasible wire, the capacity of the feasibke wire)

Figure 3:
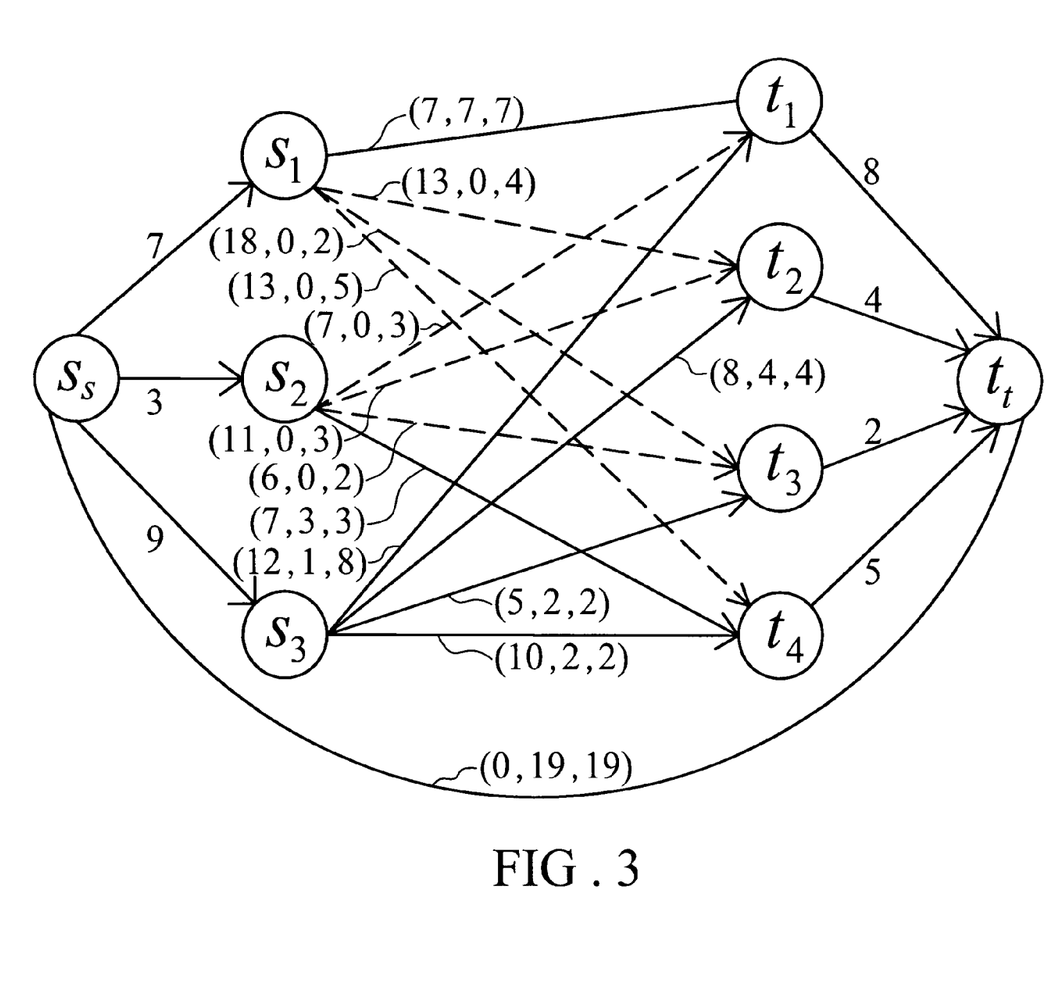
FIG. 3 is a schematic view of the flow network.

Step 2: create a flow network as shown in FIG. 3 according to the feasible wiring topology, which includes the length, the source current, the sink current and the capacity of each feasible wire between the source and the sink.

Each source current and each sink current are represented by the vertexes. $(l_{i,j}, f_{i,j}, c_{i,j})$ represents a directed edge $(s_i, t_j)$ from $s_i$ to $t_j$ for each pair of the source and the sink, where $l_{i,j}$ represents the length of the wire between the source $s_i$ and the sink $t_j$, $f_{i,j}$ represents the effective current from the source $s_i$ to the sink $t_j$, $c_{i,j}$ represents the capacity, and the capacity is smaller than or equal to the effective current $f_{i,j}$, $c_{i,j}=\min(f_{si}, f_{tj})$. In addition, two dummy vertices, representing the super source $s_s$ and the super sink $t_t$, are added. One edge from the super source $s_s$ to each distinct source $s_i$ is the total flow associated with $(0, f_{si}, f_{si})$, while one edge from each distinct sink $t_j$ to the super sink $t_t$ is the total flow current associated with $(0, f_{tj}, f_{tj})$. In addition, one edge $(s_s, t_t)$ is also added associated with $(0, f_{ss}, f_{ss})=(0,19,19)$, where $f_{ss}$ is the total flow from the super source to the super sink. Wherein the solid edge between the source $s_i$ and the sink $t_j$ represents the feasible wire, and the dashed edge represents the other wires.

Step 3: execute an algorithm to iteratively check if a negative cycle existing in the flow network. Wherein said algorithm is a negative cycle detection algorithm.

Figure 4:
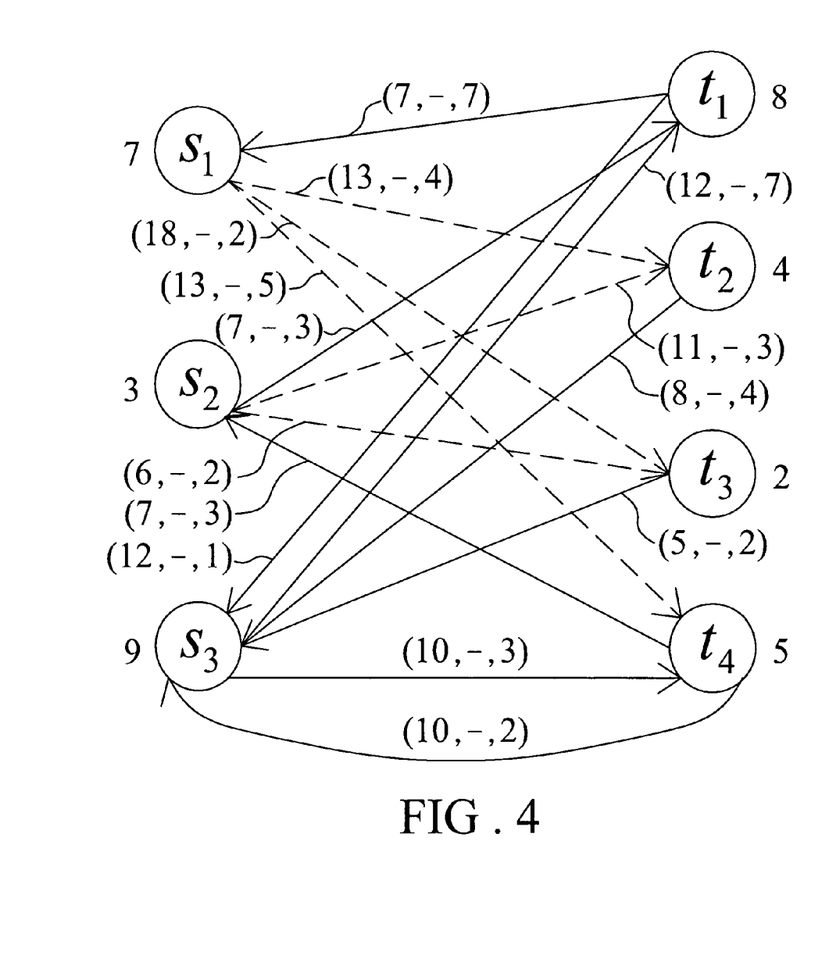
FIG. 4 is a schematic view of the residual graph of the flow network.

Firstly, create a residual graph based on said flow network as shown in FIG. 4. Define $(l'_{i,j}, f'_{i,j}, c'_{i,j})$ as the residual state of the residual length, the residual flow, and the residual capacity. For each edge $(s_i, t_j)$ between source $s_i$ and sink $t_j$ with the flow $f_{i,j}$ and the wirelength $l_{i,j}$ in the flow network, two directional edges are constructed in the corresponding residual graph as follows.

1. A forward edge $(s_i, t_j)$ has a residual wirelength $l'_{i,j}=+l_{i,j}$ and a residual capacity $c'_{i,j}=c_{i,j}-f_{i,j}$, $0 \leq f'_{i,j} \leq c_{i,j}-f_{i,j}$.

2. A backward edge $(t_j, s_i)$ has a residual wirelength $l'_{i,j}=-l_{i,j}$ and a residual capacity $c'_{i,j}=-f_{i,j}$, $-f_{i,j} \leq f'_{i,j} \leq 0$.

Wherein the wirelength and the capacity thereof, represented by the positive signs "+", are on the forward edge and the residual flow are provided by the source; the wirelength and the capacity thereof, represented by the negative signs "−", are on the backward edge and the residual flow are received by the sink.

Figure 5:
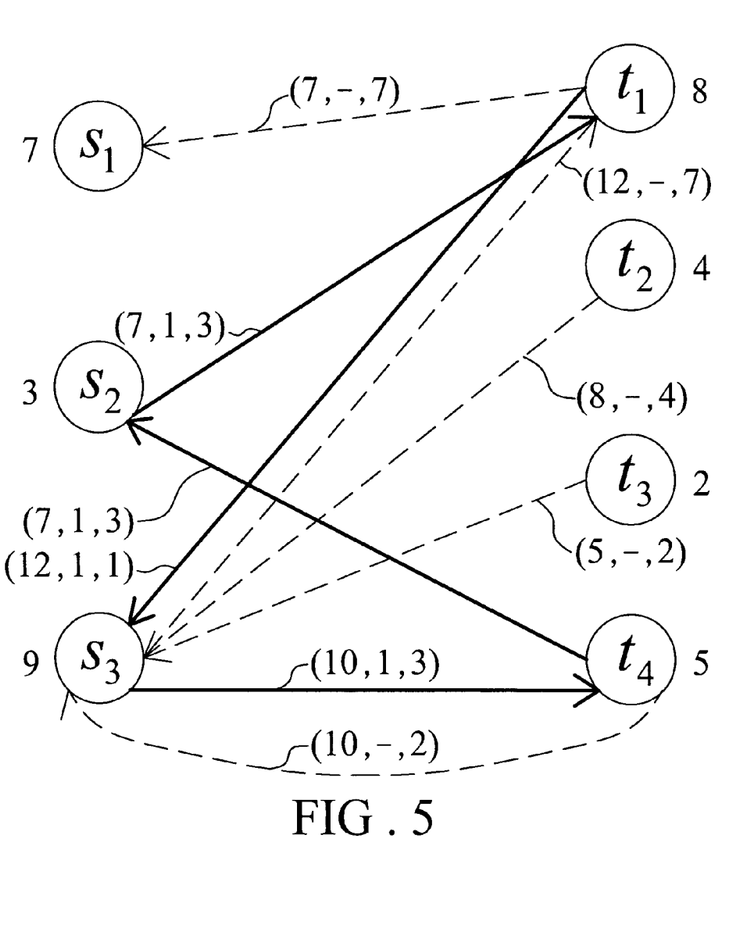
FIG. 5 is a schematic view of the residual graph with removing the negative cycle.

Secondly, check if the negative cycle existing in the residual graph. A negative cycle $C_N=\{s_i, t_j, \ldots, s_i\}$ is a cycle that starts and ends at the same source and has a negative sum of wirelength $L_C$ on its constituent edges. As shown in FIG. 5, the solid edges represents the negative cycle of the residual graph. The negative cycle $C_N=\{s_1, t_1, s_2, t_2, s_1\}$ is a cycle that starts from the source $s_1$ to the sink $t_1$, then to the source $s_2$ and the sink $t_1$, and ends at the source $s_1$. The negative sum of wirelength $L_C$ is 7+(−12)+10+(−7)=−2.

Finally, judge if the negative sum of wirelength $L_C$ is zero. If the negative sum of wirelength $L_C$ is zero, the negative exists in the residual graph and go to Step 4; else if, the negative dose not exist in the residual graph, and the feasible wiring topology is defined as an optimal wiring topology for effectively saving the routing sources and go to Step 5.

Figure 6:
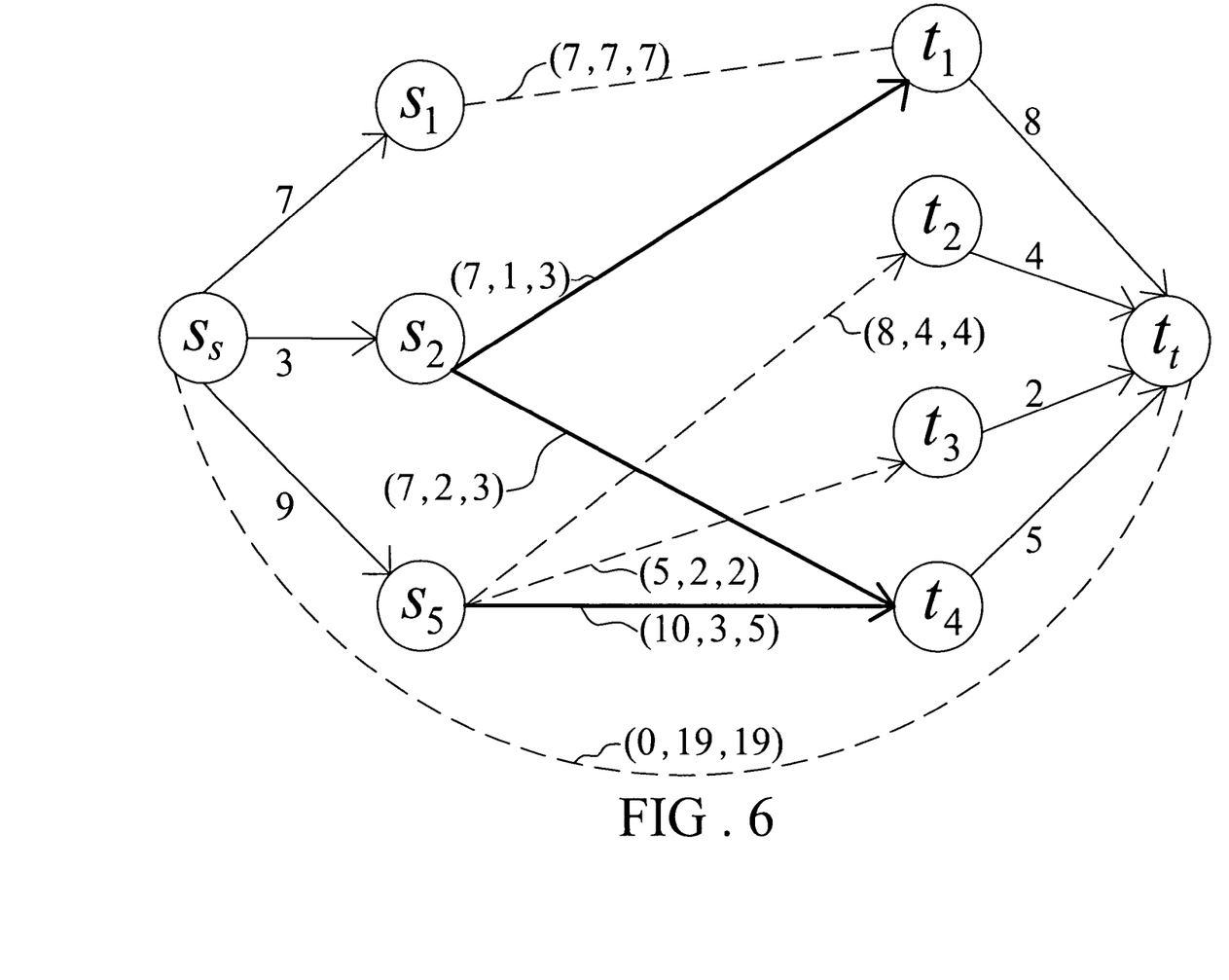
FIG. 6 is a schematic view of the optimal flow network.

Step 4: remove the negative cycle if existing in the flow network. Refer to FIG. 6 for a schematic view of the optimal flow network, which showing the flow network removed the negative cycle, obtained from FIG. 3. The steps of removing the negative cycle are described as below with Table 8.

Figure 7:
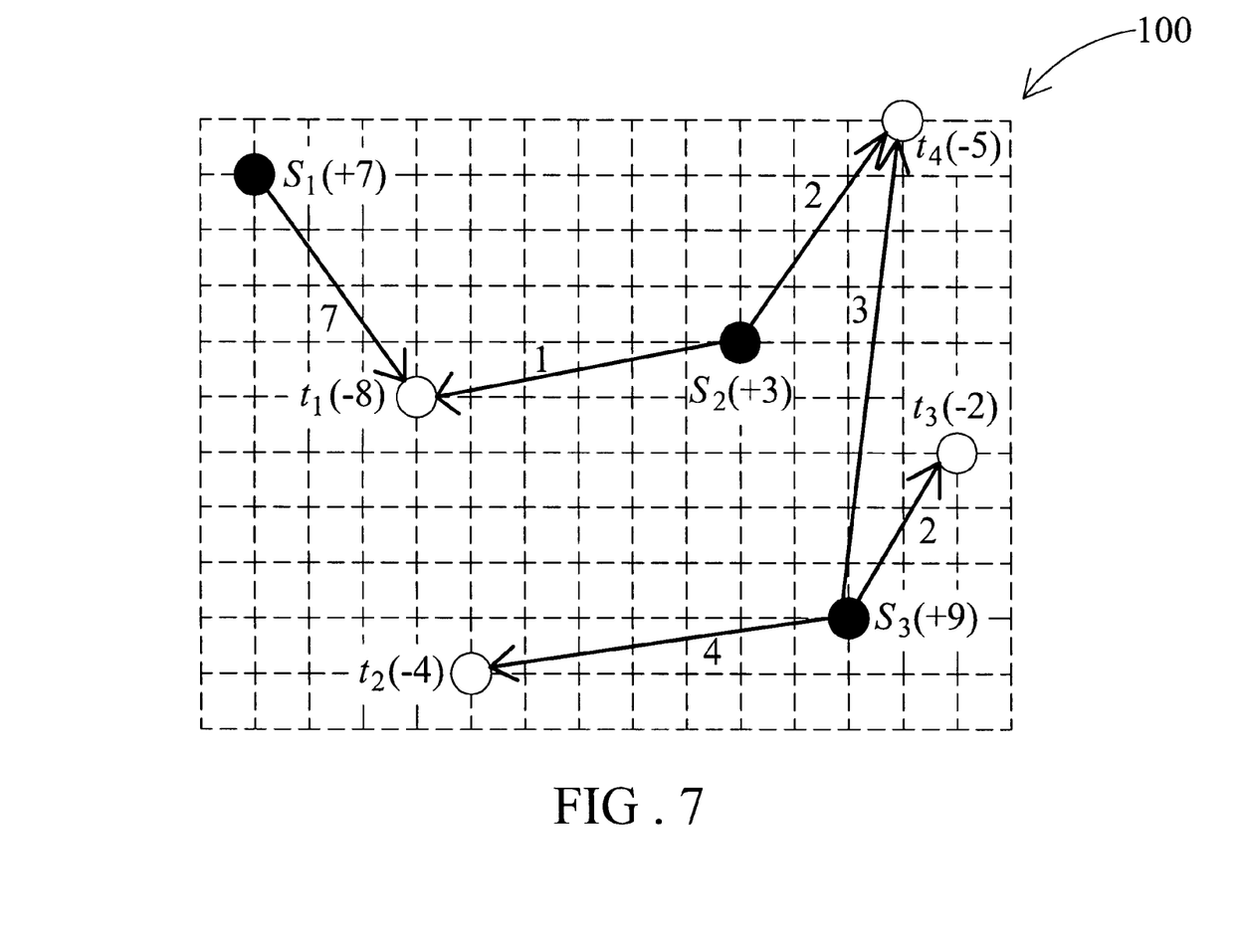
FIG. 7 is a schematic view of the optimal wiring topology on the chip set with single routing layer.

Firstly, one unit of the effective current flowing from the source $s_3$ to the sink $t_1$ is changed to be injected from the source $s_2$ along the direction of the negative cycle, so the capacity of the feasible wire between the source $s_2$ and the sink $t_4$ is varied to be 2 unit and the capacity of the feasible wire between the source $s_3$ and the sink $t_4$ is varied to be 3 unit. Secondly, an optimal wiring topology is obtained on the chip set 100 as shown in FIG. 7. If the width of one of the feasible wires in the optimal wiring topology is smaller than the minimal wiring length $w_{min}$, the width of said wire is modified to be the minimal wiring length $w_{min}$; if the width of said wire is lager than the maximal wiring length $w_{max}$, said wire is altered by multiple wires so that the width of said wire is modified to be the suitable width in accordance with the minimal wiring length $w_{min}$ and the maximal wiring length $w_{max}$.

TABLE 8

The length and the capacity of the wire in the optimal wiring topology.

| S/T | $t_1(-8)$ | $t_2(-4)$ | $t_3(-2)$ | $t_4(-5)$ |
|---|---|---|---|---|
| $s_1(+7)$ | (7, 7) * | (13, 0) | (18, 0) | (13, 0) |
| $s_2(+3)$ | (7, 1) * | (11, 0) | (6, 0) | (7, 2) * |
| $s_3(+9)$ | (12, 0) | (8, 4) * | (5, 2) * | (10, 3) * |

* (the length of the feasible wire, the capacity of the feasibke wire)

Figure 8:
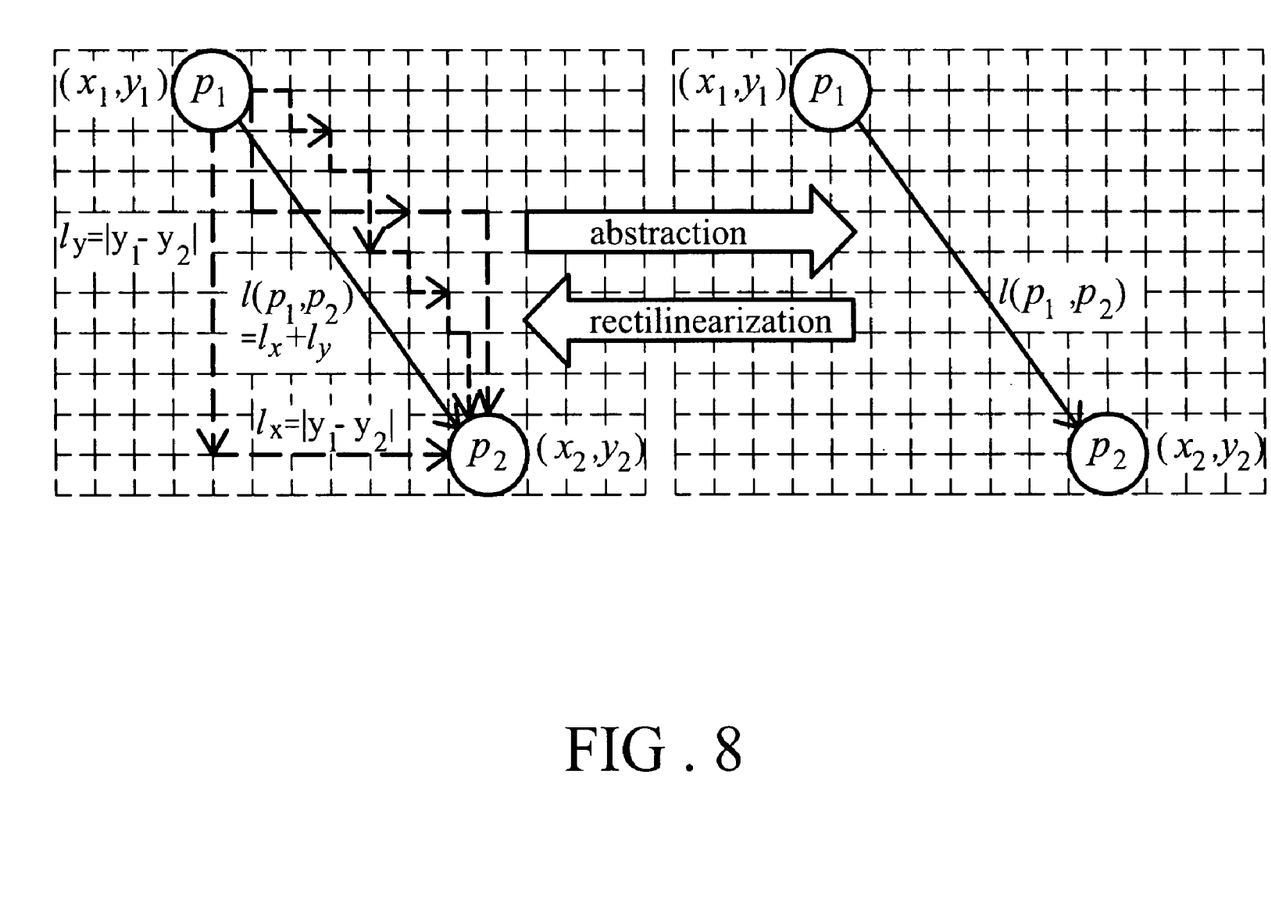
FIG. 8 is a schematic view of the conversion between the optimal wiring topology and the optimal rectilinear routing.
Figure 9:
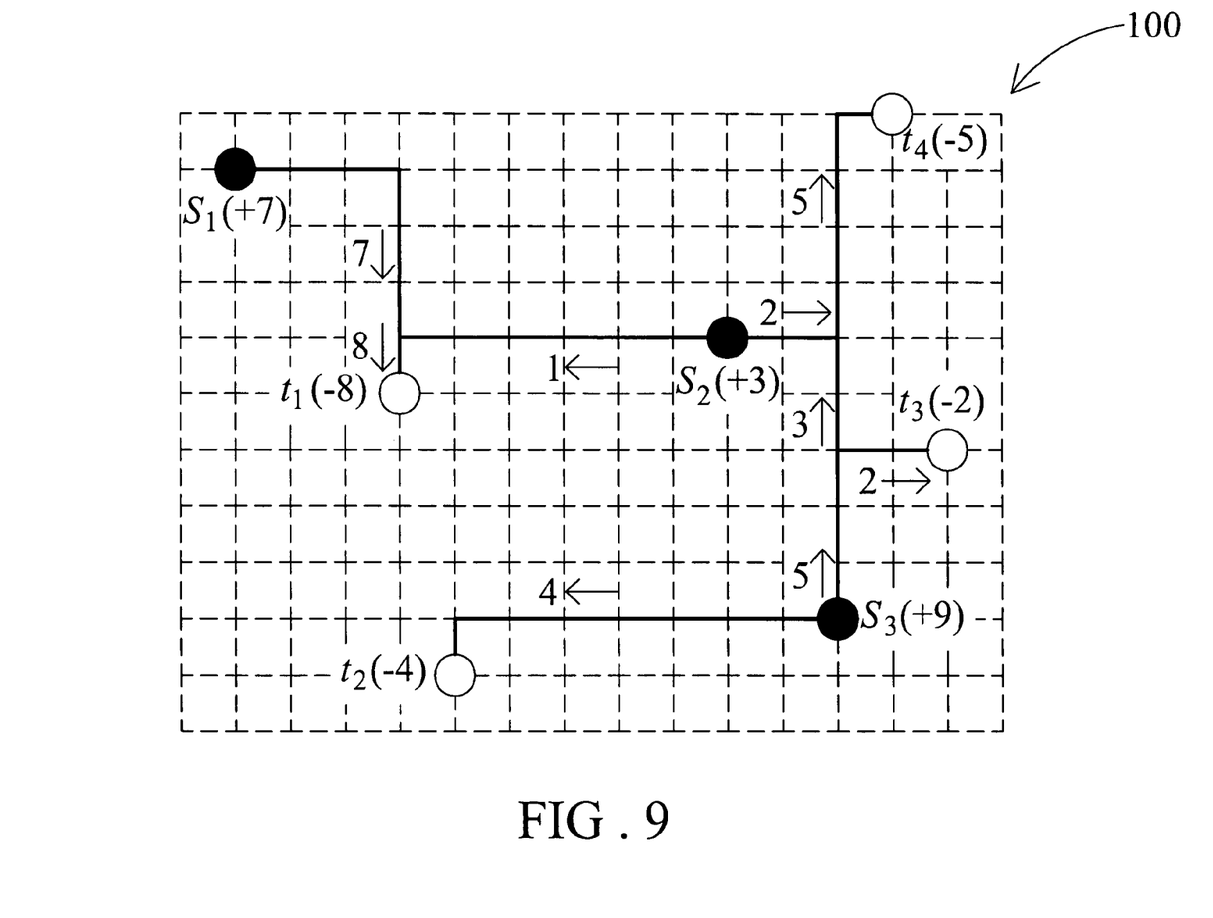
FIG. 9 is a schematic view of the optimal rectilinear routing on the chip set with single routing layer.

Step 5: finally, replace the feasible wire with a ladder-type wire by one end of the feasible wire connected by a horizontal wire and another end of the feasible wire connected by a vertical wire as shown in FIG. 8. In other words, the optimal wiring topology is conversed by rectilinearization to form an optimal rectilinear routing as shown in FIG. 9. Wherein the solid line represents the wire and the number of the arrow near the solid line represents the effective current of the wire.

Figure 10:
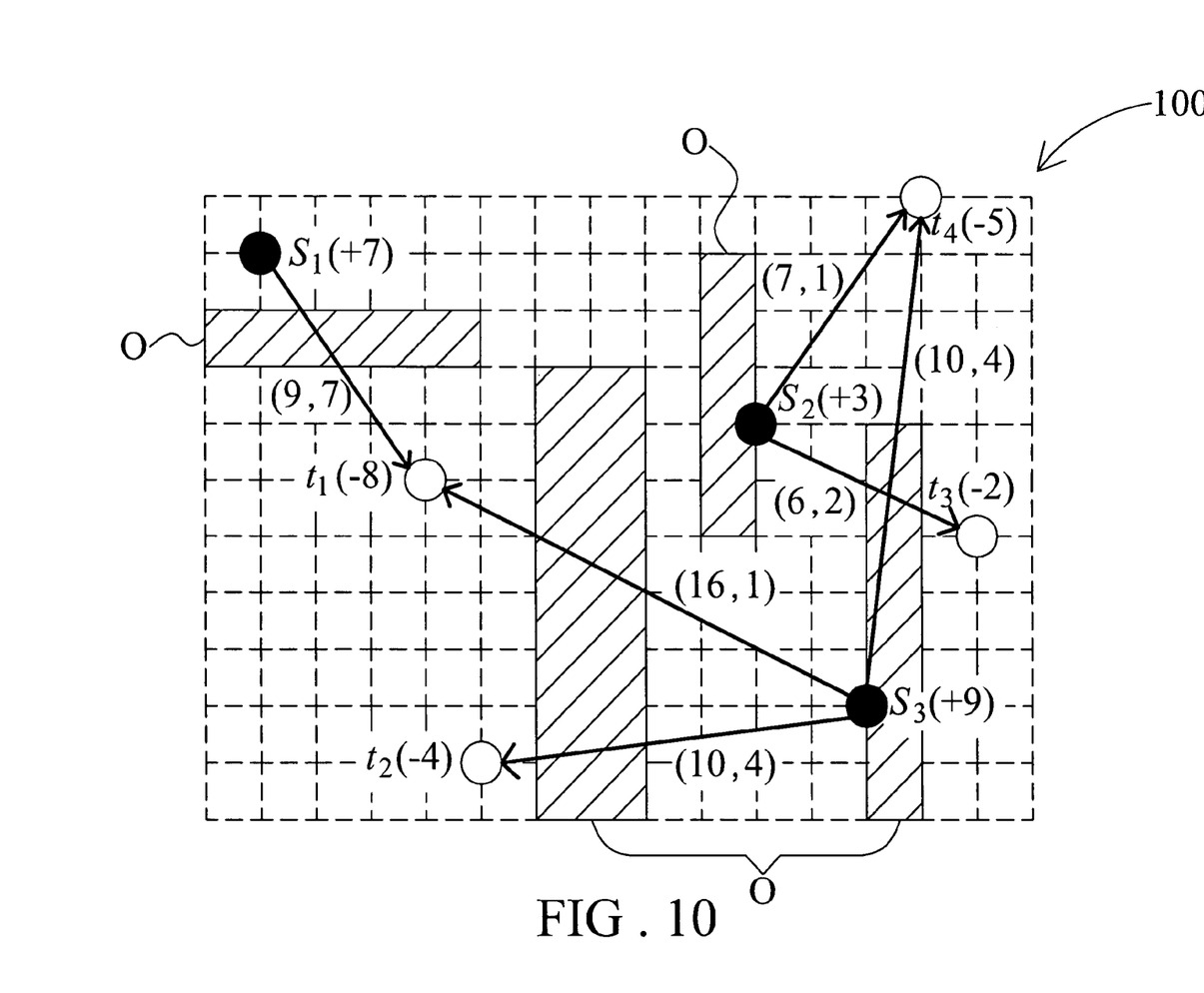
FIG. 10 is a schematic view of the optimal wiring topology on the chip set with single routing layer considering the obstacle.

In an preferred embodiment, a plurality of obstacles O are disposed on the chip set 100 as shown in FIG. 10. The feasible wires between the source $S=\{s_1, s_2, s_3\}$ and the sink $T=\{t_1, t_2, t_3, t_4\}$ are selected with considering the obstacles. However, the wire is straightly connected between the source and the sink so that the wirelength is added by the obstacle. The length of the wire bypassing the obstacle is added a routing length, where the routing length is a difference between the length of the wire bypassing the obstacle and the length of said wire straightly connecting the source and the sink. Calculate the length added the routing length up to obtain all the feasible wire. The length of the feasible wire between the source $s_1$ and the sink $t_1$ is 9 unit and the capacity thereof is 7 unit. The length of the feasible wire between the source $s_2$ and the sink $t_3$ is 6 unit and the capacity thereof is 2 unit. The length of the feasible wire between the source $s_2$ and the sink $t_4$ is 7 unit and the capacity thereof is 3 unit. The length of the feasible wire between the source $s_3$ and the sink $t_2$ is 10 unit and the capacity thereof is 4 unit. The length of the feasible wire between the source $s_3$ and the sink $t_4$ is 10 unit and the capacity thereof is 5 unit.

Figure 10A:
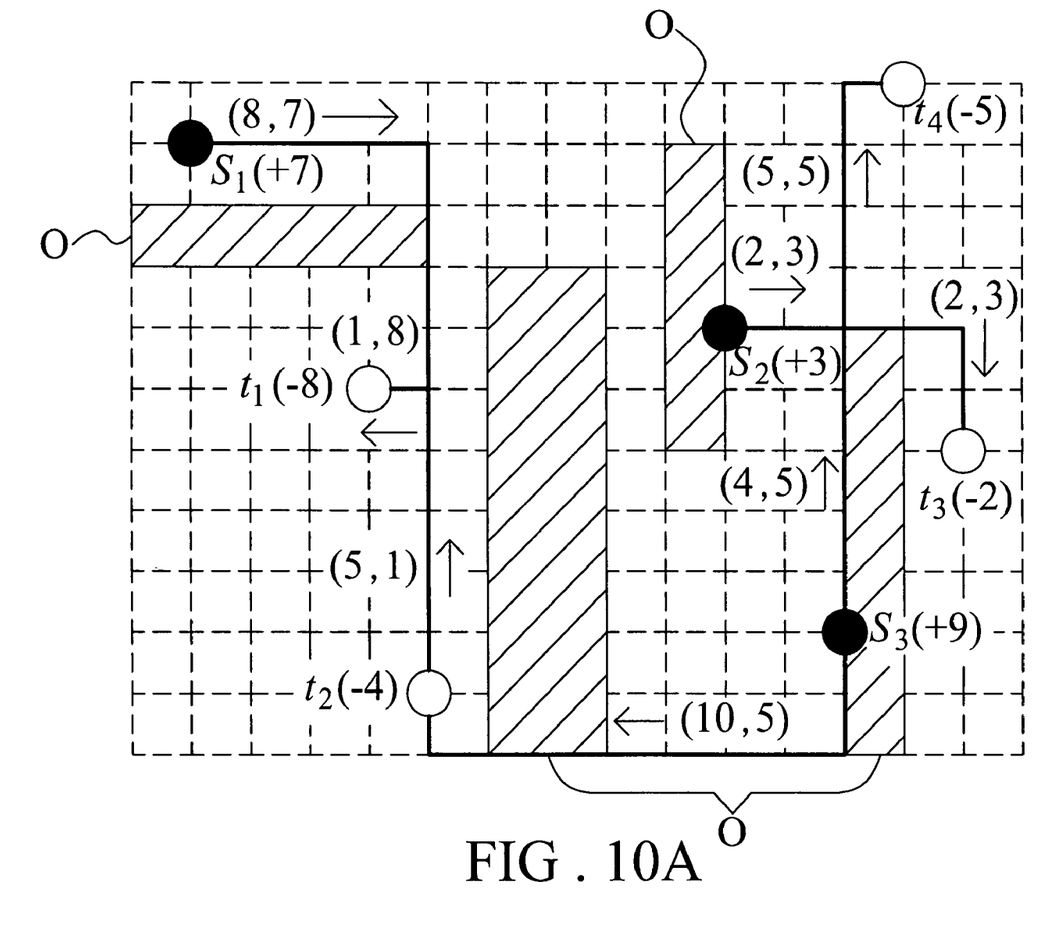
FIG. 10A is a schematic view of the optimal rectilinear routing on the chip set with single routing layer considering the obstacle.

Link all the feasible wires with each other to construct a feasible wiring topology. Finally, the optimal wiring topology is conversed by rectilinearization to form an optimal rectilinear routing as shown in FIG. 10A.

Figure 11:
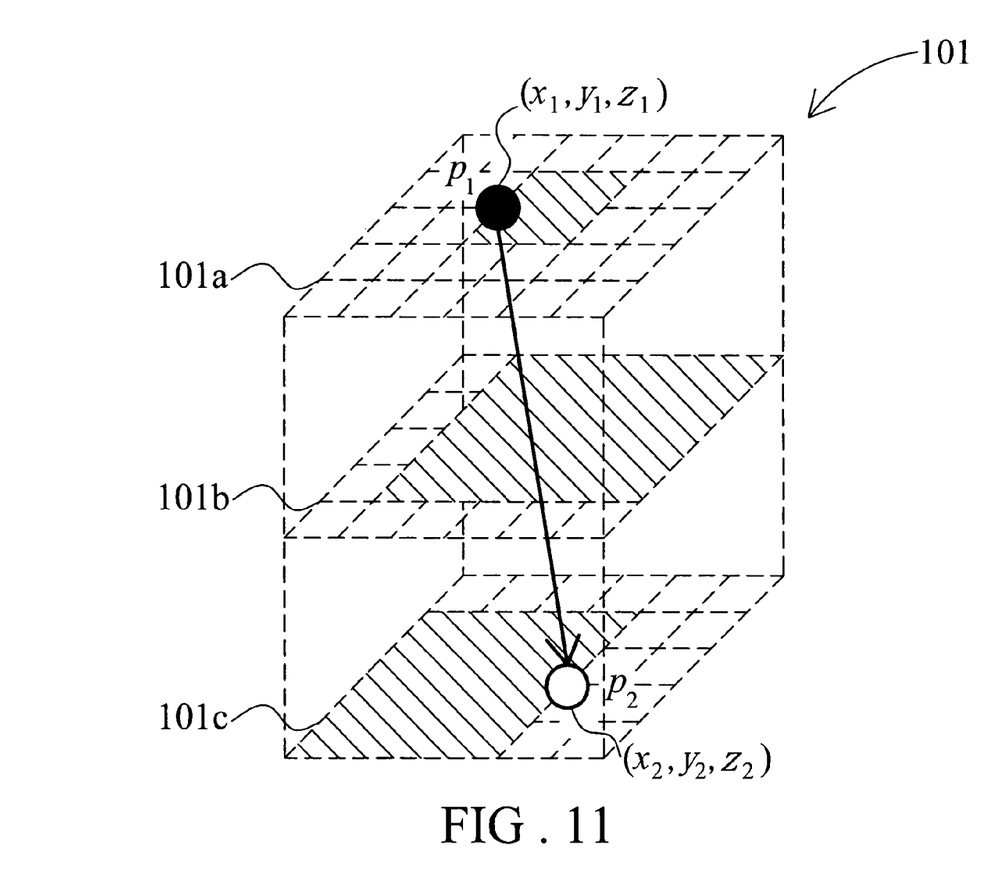
FIG. 11 is a schematic view of the optimal wiring topology on the chip set with multiple routing layers.
Figure 11A:
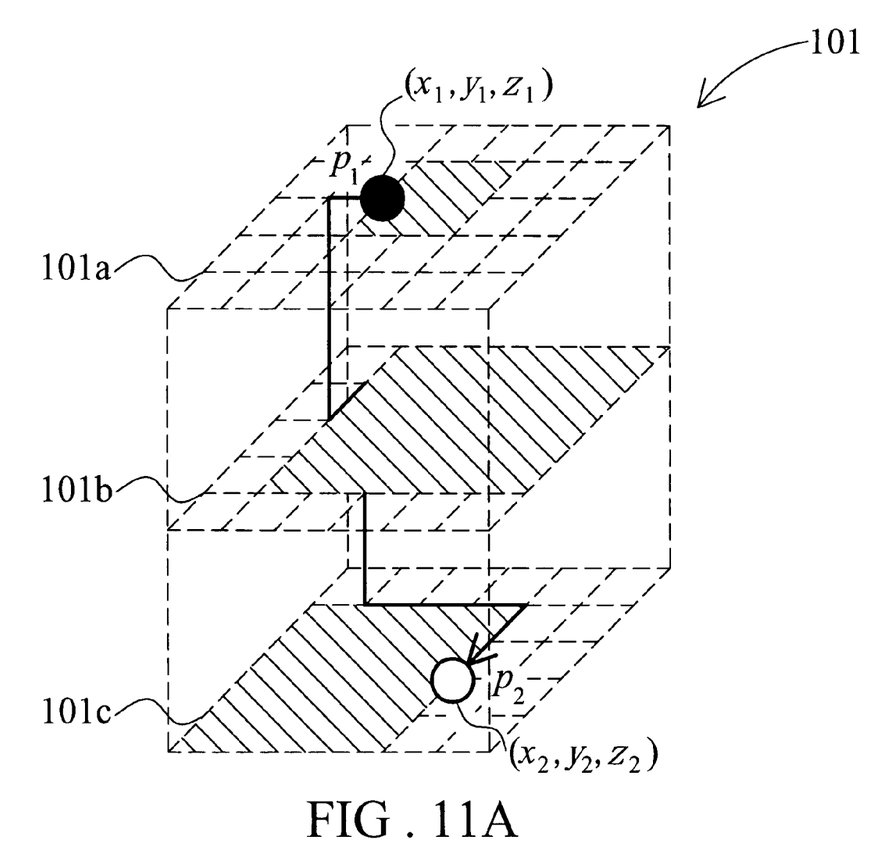
FIG. 11A is a schematic view of the optimal rectilinear routing on the chip set with multiple routing layers.

In an preferred embodiment, the chip set 101 has at least three routing layers 101a, 101b and 101c stacked as shown in FIG. 11. The length of the wire passing those routing layers has a minimal distance between the routing layers with considering the routing layers 101a, 101b and 101c. The feasible wires between the source $p_1(x_1, y_1, z_1)$ and the sink $p_2(x_2, y_2, z_2)$ are selected to construct a feasible wiring topology. Finally, the optimal wiring topology is conversed by rectilinearization to form an optimal rectilinear routing as shown in FIG. 11A Above all, the present invention is utilized after the routing stage to apply for local modification for avoiding electromigration in the fabrication method of integrated circuits. Therefore, the present invention is utilized to design an optimal wiring topology on the chip set before the routing stage for decreasing the routing resources.

The present invention is utilized by the applicable products such as the analog design, the mixed signal design and the reliability-driven design automation tool, and the applicable industries such as IC design house, IC design service company, IC design tool vendor and IC design foundry.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for designing wiring topology for electromigration avoidance, applied for selecting an optimal wiring topology among a plurality of wiring topologies on a chip set, wherein each of the wiring topologies has a plurality of sources, a plurality of sinks and a plurality of wires, each of the wires is directly connected between one of the sources and one of the sinks, each of the sources provides a source current, each of the sinks receives a sink current, and an effective current flows from one of the sources into one of the sinks through each of the wires, the method comprising steps of:

calculating the length of all the wires to choose the minimum among the wires as a feasible wire;

deciding a capacity of the feasible wire, wherein the capacity is the maximum of the effective current through the feasible wire;

deciding the capacity of each of the other wires according to the capacity, the source current and the sink current of the feasible wire;

comparing the length of the other wires to choose another feasible wire;

repeating said steps until finding all feasible wires to construct a feasible wiring topology;

creating a flow network according to the feasible wiring topology;

executing an algorithm to iteratively check if a negative cycle exists in the flow network; and removing the negative cycle if the negative cycle exists in the flow network to obtain the optimal wiring topology.

2. The method for designing wiring topology for electromigration avoidance of claim 1, wherein the step of deciding the capacity of the feasible wire comprises: comparing the source current and the sink current of the feasible wire to choose a minimum among the source current and the sink current as the capacity of the feasible wire.

3. The method for designing wiring topology for electromigration avoidance of claim 2, further comprising: defining the feasible wiring topology as the optimal wiring topology if the flow network does not comprise any negative cycle.

4. The method for designing wiring topology for electromigration avoidance of claim 3, further comprising: defining a minimal wiring length and a maximal wiring length; and modifying the length of all the feasible wires in the optimal wiring topology in accordance with the minimal wiring length and the maximal wiring length.

5. The method for designing wiring topology for electromigration avoidance of claim 3, further comprising: replacing the feasible wire with a ladder-type wire by connecting one end of each of the feasible wires by a horizontal wire and connecting another end of each of the feasible wires by a vertical wire, wherein the horizontal wire is perpendicular to the vertical wire.

6. The method for designing wiring topology for electromigration avoidance of claim 1, wherein the steps of comparing the length of the other wires comprises: judging if the capacity of each of the other wires is zero.

7. The method for designing wiring topology for electromigration avoidance of claim 1, further comprising steps of:

providing an obstacle for disposing on the chip set, wherein the obstacle has a routing length;

defining at least one wire bypassing the obstacle, selected from the wires; and adding the routing length to the length of the wire to bypass the obstacle.

8. The method for designing wiring topology for electromigration avoidance of claim 1, further comprising a step of:

providing at least two stacked routing layers for the chip set, so as to form a minimal distance between the two stacked routing layers; and calculating the length of the wire passing the two stacked routing layers with the minimal distance between the two routing layers.

9. The method for designing wiring topology for electromigration avoidance of claim 1, wherein the step of executing the algorithm to iteratively check if the negative cycle exists in the flow network comprises a step of:

providing a negative cycle detection algorithm.

10. The method for designing wiring topology for electromigration avoidance of claim 1, further comprising:

providing a wiring topology designed software;

setting the flow network in the wiring topology designed software;

simulating the wiring topologies by the wiring topology designed software;

inputting positions of the sources, the positions of the sinks, the source current of each of the sources, the sink current of each of the sinks, a minimal wiring length, a maximal wiring length and a maximum tolerable current density into the wiring topology designed software; and computing the optimal wiring topology according to the lengths of the wires by the wiring topology designed software.

* * * * *